Aug. 1, 1950   H. F. ADAMS   2,517,157
FISH LURE
Filed Dec. 22, 1945
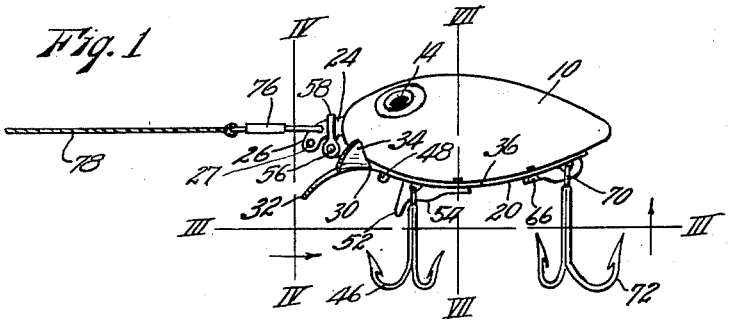
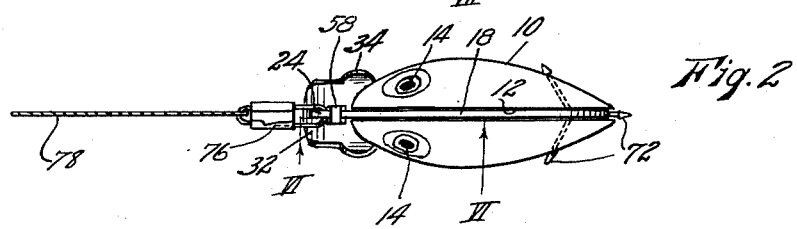
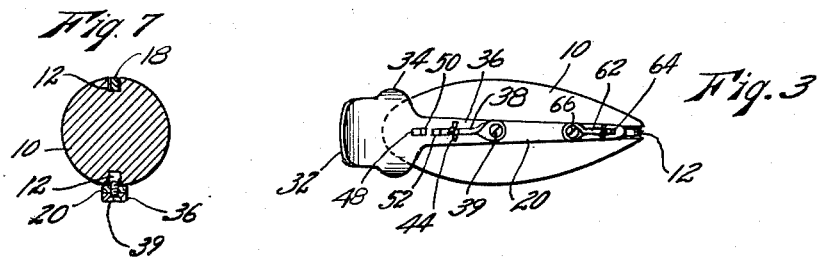
INVENTOR,
Herbert F. Adams.
BY Roy E. Hamilton,
Attorney.

Patented Aug. 1, 1950

2,517,157

UNITED STATES PATENT OFFICE 2,517,157

FISH LURE

Herbert F. Adams, Springfield, Mo.

Application December 22, 1945, Serial No. 636,652

5 Claims. (Cl. 43—42.36)

This invention relates to improvements in fish lures and has particular reference to a fish lure having an adjustable harness for securing in position lure plugs of different designs.

For different types of fishing it is desirable to change the appearance of the lure by changing the plug design for obtaining the most effective results. It is quite essential that the change of lures be made quickly and properly without the loss of too much time.

The principal object of the present invention is the provision of a fish lure including a harness for carrying plugs of different designs and which may be easily adjusted for removing one plug and inserting another.

Another object of this invention is the provision of a fish lure having a hinged harness adapted to engage in a groove formed lengthwise of the plug for securing the plug to the harness.

A further object is the provision of a simple and easily operable fish lure whereby the general appearance of the lure may be quickly and effectively changed.

With these objects in view as well as other objects which will appear during the course of the specification, reference will be had to the drawing wherein—

Figure 1 is a side elevational view illustrating a fish lure embodying the features of this invention.

Fig. 2 is a plan view of the lure shown in Figure 1.

Fig. 3 is an inverted sectional view taken on line III—III of Figure 1.

Fig. 4 is a sectional view taken on line IV—IV of Figure 1.

Fig. 5 is a side elevational view of the harness extended and with the plug removed.

Fig. 6 is an enlarged fragmentary sectional view taken on line VI—VI of Figure 2.

Fig. 7 is a cross sectional view taken on line VII—VII of Figure 1.

Fig. 8 is a longitudinal central sectional view of the plug.

Throughout the several views like reference characters refer to similar parts and the numeral 10 designates a lure plug of substantially ovoid form, having a continuous groove 12 along its longitudinal medial plane. This plug, as shown, is stream-lined for proper movement through the water. The forward or front end of the plug is provided with a pair of eyes 14 and the body of the plug is preferably colored and designed to imitate bait attractive to certain types of fish. It is quite apparent that various designs might be used on the same plug structure to serve as lures for the various types of fish.

The harness or chassis 16 of the device comprises a curved upper section 18 and a curved lower section 20 pivoted together by hinge pin 22 for longitudinal opening and closing movement. Extending forwardly from the free end of harness section 18 is a downwardly curved line attaching ear 24 perforated adjacent its outer end at 26 and 27 and having a recess 28 along its lower edge. Section 18 is substantially uniform in thickness and is adapted to be fitted into groove 12 of the plug 10.

The lower harness section 20 comprises a diving spoon 30 having a downwardly and forwardly projecting head 32 extended slightly in front of the forward end of the associated plug, and operable to cause a downward movement of the plug and to also serve to cause a desirable wiggling of the lure. This spoon head has a pair of like upwardly projecting side wings 34 and a narrow body portion 36 which conforms to the lower contour of the plug 10. A member 38 extends through a slot 40 formed through the body of the spoon so that its forward portion is adapted to be fitted into the plug groove 12 and the rearwardly extending portion is below the spoon body. A notch 42 formed in the upper edge of member 38 presents, in conjunction with the spoon body, an opening to receive the eye 44 of a fish hook member 46. The end portion of the member 38 is shaped to receive a screw 39 by means of which it is fixed to the body of the spoon. A depending notched member 48 integral with the member 38 is adapted to pass through an opening 50 formed through the body of the spoon to engage said spoon body and prevent movement of member 38 to and from said spoon when the screw 39 is set. A depending finger 52 disposed in front of the fish hook precludes movement of the hook too far forward so that it can not interfere with the forward parts of the lure; furthermore, the rearward swinging of the front hook is limited by the rib 54 of the member 38. The forward end of member 38 is provided with a hinge pin 56 by means of which a clevis 58 is hinged to the forward end of the member 38 for movement to engage the ear 24 and hold the parts together about the plug as shown in Figure 6. A detent 60 formed on the upper side of member 38 is adapted to engage in recess 28 of member 18 to preclude longitudinal distortion of the harness sections. A hinge member 62 is inserted through a slot 64 formed in the body portion of the spoon body 36 with its rearward portion perforated to receive the hinge pin 22. This rearward portion also fits into the groove 12 of the plug 10. A screw 66 serves to attach the forward end of member 62 tightly against the spoon body 36. Member 62 is notched at 68 to present an opening for the reception of the eye 70 of the rear fish hook member 72. This member 62 has a forwardly projecting rib 74 which limits the forward swinging of hook 72, thus preventing any interlocking of the hook tines during the operation of the lure. When the clevis 58 is moved to the locking position and the safety pin 76 is positioned as shown the clevis will be held against forward movement so that the parts 18 and 20 of the harness can not move outwardly from the clevis. A suitable fish line 78 is attached to safety pin 76 for drawing the fish lure through the water. The depth of diving of the lure can be varied by simply attaching the safety pin 76 in the upper perforation 26 or the lower perforation 27 to vary the distance of the line hitch from spoon head 32.

When in actual use the spoon will cause the lure to move in the water at the desired depth and the fish hooks will trail backwardly due to the friction in the water but can never become entangled or fouled by engaging the other parts of the lure.

It is apparent that slight changes might be made without departing from the spirit of the invention.

What I claim as new and desire to cover by Letters Patent is:

1. A fishing device comprising a substantially ovoid plug grooved along its longitudinal medial plane; a harness having upper and lower curved rigid members freely hinged together at their rear ends and adapted to be positioned about said plug and in said groove; a line attaching ear on the forward end of the upper harness member; a clevis pivoted to the forward end of said lower harness member and adapted to be moved to engage said ear to secure the harness members together about said plug; depending fish hooks carried by said lower harness member and means for attaching a fish line to said ear whereby disengagement of said clevis therefrom is prevented.

2. A fishing device comprising a substantially ovoid plug grooved along its longitudinal medial plane; a harness having upper and lower curved rigid members freely hinged together at their rear ends and adapted to be positioned about said plug and in said groove; a line attaching ear on the forward end of the upper harness member; a clevis pivoted to the forward end of said lower harness member and adapted to be moved to engage said ear to secure the harness members together about said plug; means for attaching a fish line to said ear whereby said clevis is secured against disengagement from said ear; depending fish hooks carried by said lower harness member; and a forwardly and downwardly extending spoon carried by the forward end portion of said lower harness member.

3. A fishing device comprising a substantially ovoid plug grooved along its longitudinal medial plane; a harness having upper and lower curved rigid members freely hinged together at their rear ends and adapted to be positioned about said plug and in said groove; a line attaching ear on the forward end of the upper harness member; a clevis pivoted to the forward end of the lower harness member and adapted to be moved to engage said ear to secure the harness members together about said plug; spaced apart fish hooks hingedly carried by said lower harness member; and means integral with said lower harness member whereby the hinging movement of said fish hooks toward each other is limited to prevent interengaging of said hooks.

4. A fishing device comprising a longitudinally grooved plug; an elongated harness having upper and lower curved rigid members freely hinged together at their rear ends and being adapted to be fitted into the groove of said plug whereby the plug is held in fixed relation to said harness; a diving spoon integral with the front portion of said harness; releasable means for securing the free ends of said upper and lower harness members together; a fish line attaching ear at the forward end of said upper harness member; and means for attaching a fish line to said ear whereby said harness securing means is locked against release.

5. A fishing device comprising a substantially ovoid plug grooved along its longitudinal medial line; a harness having upper and lower curved rigid members freely hinged together at their rear ends and adapted to be positioned about said plug and in said groove; releasable means to secure the forward ends of said harness members together including a line attaching ear on the forward end of the upper harness member and having a plurality of vertically spaced apart holes formed therethrough; a forwardly and downwardly extending spoon carried by the forward end portion of said lower harness member; a fishline securing means selectively fixed in one of the holes formed in said attaching ear whereby the depth of diving of said plug is determined and whereby release of said harness securing means is prevented; and depending fish hooks carried by said lower harness member.

HERBERT F. ADAMS.

REFERENCES CITED

The following references are of record in the file of this patent:

UNITED STATES PATENTS

| Number | Name | Date |
|---|---|---|
| 573,572 | Dales | Dec. 22, 1896 |
| 761,926 | Van Loghem | June 7, 1904 |
| 765,482 | Hardy | July 19, 1904 |
| 1,733,777 | Comstock | Oct. 29, 1929 |
| 1,870,273 | Willinger | Aug. 9, 1932 |
| 1,955,408 | Chapleau et al. | Apr. 17, 1934 |

FOREIGN PATENTS

| Number | Country | Date |
|---|---|---|
| 23,457 | Great Britain | of 1894 |
| 94,373 | Switzerland | Nov. 4, 1921 |
| 741,382 | France | Dec. 3, 1932 |